United States Patent [19]

Kienle

[11] Patent Number: 5,138,548
[45] Date of Patent: Aug. 11, 1992

[54] METHOD OF ASSURING INTEGRITY OF INFORMATION BEING STORED

[75] Inventor: Karin Kienle, Weil der Stadt, Fed. Rep. of Germany

[73] Assignee: Robert Bosch GmbH, Stuttgart, Fed. Rep. of Germany

[21] Appl. No.: 458,666

[22] PCT Filed: Jun. 13, 1988

[86] PCT No.: PCT/DE88/00352
§ 371 Date: Jan. 3, 1990
§ 102(e) Date: Jan. 3, 1990

[87] PCT Pub. No.: WO89/00641
PCT Pub. Date: Jan. 26, 1989

[30] Foreign Application Priority Data
Jul. 11, 1987 [DE] Fed. Rep. of Germany ....... 3723024

[51] Int. Cl.⁵ .................................... G06F 12/14
[52] U.S. Cl. ................ 395/425; 364/246.9; 364/245.2; 364/245.3; 364/246.6; 364/286.6; 364/431.12; 364/DIG. 1
[58] Field of Search ............... 364/245.2, 245.3, 246.6, 364/970, 970.1, 970.2, 246.9, 286.6, 431.12

[56] References Cited

U.S. PATENT DOCUMENTS

| | | | |
|---|---|---|---|
| 4,084,240 | 4/1978 | Lappington | 364/425 |
| 4,677,558 | 6/1987 | Böhmler et al. | 364/900 |
| 4,797,853 | 1/1989 | Savage et al. | 364/900 |
| 4,821,175 | 4/1989 | Hikita et al. | 364/200 |
| 4,896,259 | 1/1990 | Jacobs et al. | 364/200 |
| 4,896,263 | 1/1990 | Bräuninger et al. | 364/200 |
| 4,903,198 | 2/1990 | Iwasaki | 364/200 |
| 4,958,314 | 9/1990 | Imai et al. | 364/900 |

FOREIGN PATENT DOCUMENTS 60-244650 12/1985 Japan .
2120410 11/1983 United Kingdom .

OTHER PUBLICATIONS

Weinberger: Dynamic Configuration IBM Technical Disclosure Bulletin, vol. 15, No. 10 Mar. 1973, pp. 3052-3055.

Primary Examiner—Salvatore Cangialosi
Attorney, Agent, or Firm—Frishauf, Holtz, Goodman & Woodward

[57] ABSTRACT

A device for controlling technical installations and machines, particularly combustion engines in motor vehicle, is proposed, having at least one microprocessor, at least one permenently programmed memory, and at least one freely programmable memory, in which vehicle-specific data, retrieval codes of the data, and at least one address pointer can be input into the freely programmable memory (6). Further proposed is a control scheme according to which are stored, in the freely programmable memory, first the data, then the associated retrieval codes and finally an address pointer which contains the addresses of the data.

8 Claims, 2 Drawing Sheets

METHOD OF ASSURING INTEGRITY OF INFORMATION BEING STORED

STATE OF THE TECHNOLOGY

The invention is an improvement upon an apparatus for control of technical installations and machines, particularly of combustion engines in motor vehicles.

Such a control scheme is known from German Published Unexamined Application DE-OS 35 43 966 and corresponding U.S. Ser. No. 201,343, BRÄUNINGER et al., now U.S. Pat. No. 4,896,263, issued Jan. 23, 1990. It features at least one freely programmable memory and at least one permanently programmed memory. In the permanently programmed memory are stored multiple variants of data records under various retrieval codes, and in the freely programmable memory are stored the various retrieval codes of the data records. If such a control scheme is desired for various purposes, for example for use in a variety of vehicle types, inputting appropriate retrieval codes in the freely programmable memory permits retrieval of appropriately selected data records from the permanently programmed memory. The disadvantage of this approach is that the possible uses of the control device is limited by the number of various data records. It is not possible for the user of the control device to modify the data records easily; rather, swapping out of the control device or at least the freely programmable memory is required.

German Published Unexamined Application DE-OS 34 07 920 and corresponding U.S. Pat. No. 4,677,558, BÖHMLER et al., issued Jun. 30, 1987 discloses a control device in which the permanently programmed memory stores the basic program for generation of various control commands and a program for selection of the data required in the calculations. A freely programmable memory stores a specific data record with the associated retrieval code for the machine or vehicle to be controlled. The data are input into the control device, together with the retrieval codes, by the manufacturer. Only he can—if necessary—alter the addresses in the freely programmable memory and add more data.

The disadvantage is that the user of such a control device is initially tied to the data record of the manufacturer, and the alteration possibilities are limited. Furthermore, the assistance of the manufacturer must be enlisted to make changes. Even after alteration of the data and/or addresses, the user again has only one data record available. Thus, the possibilities of use are severely limited.

ADVANTAGES OF THE INVENTION

By contrast, the apparatus and method of the present invention have the advantage that the user himself can freely choose one or multiple data records, and is not tied to the data presupplied by the manufacturer. The manufacturer of the control device merely supplies the functional program, i.e. the calculation program and the program for selection of data. This results in substantially more possibilities of use for such a control device. It is particularly advantageous to be able to recognize faulty memory cells when storing data, the associated retrieval codes and an address pointer. Then the data, retrieval codes, and the address pointer are stored in intact memory cells.

DRAWING

A sample embodiment of the invention will be explained with reference to the drawings, in which.

DESCRIPTION OF THE PREFERRED EMBODIMENT

The apparatus and method according to the invention are suitable for controlling an arbitrarily wide range of technological installations and machines. The description focuses only by way of example on the control of a combustion engine of a motor vehicle.

A control scheme of the sort described here involves an electronic engine control with at least a microprocessor, at least one permanently programmed memory, and at least one freely programmable memory. These control devices are built in, during manufacture of a vehicle, at a suitable location. The control devices for various vehicle types and models are identical. They initially contain merely calculation programs, e.g. for various engine control data such as the ignition angle and ignition angle correction, as well as a program for selection of the data needed by the calculation program. These so-called "basic programs" are stored in the permanently programmed memory of the control device. At the end of a motor vehicle assembly line, the user of the control device, the motor vehicle manufacturer, can input the vehicle-specific data into the freely programmable memory of the control device. To do this, it is unnecessary to open the control device, which is hermetically sealed for protection against external influences.

Figure 1:
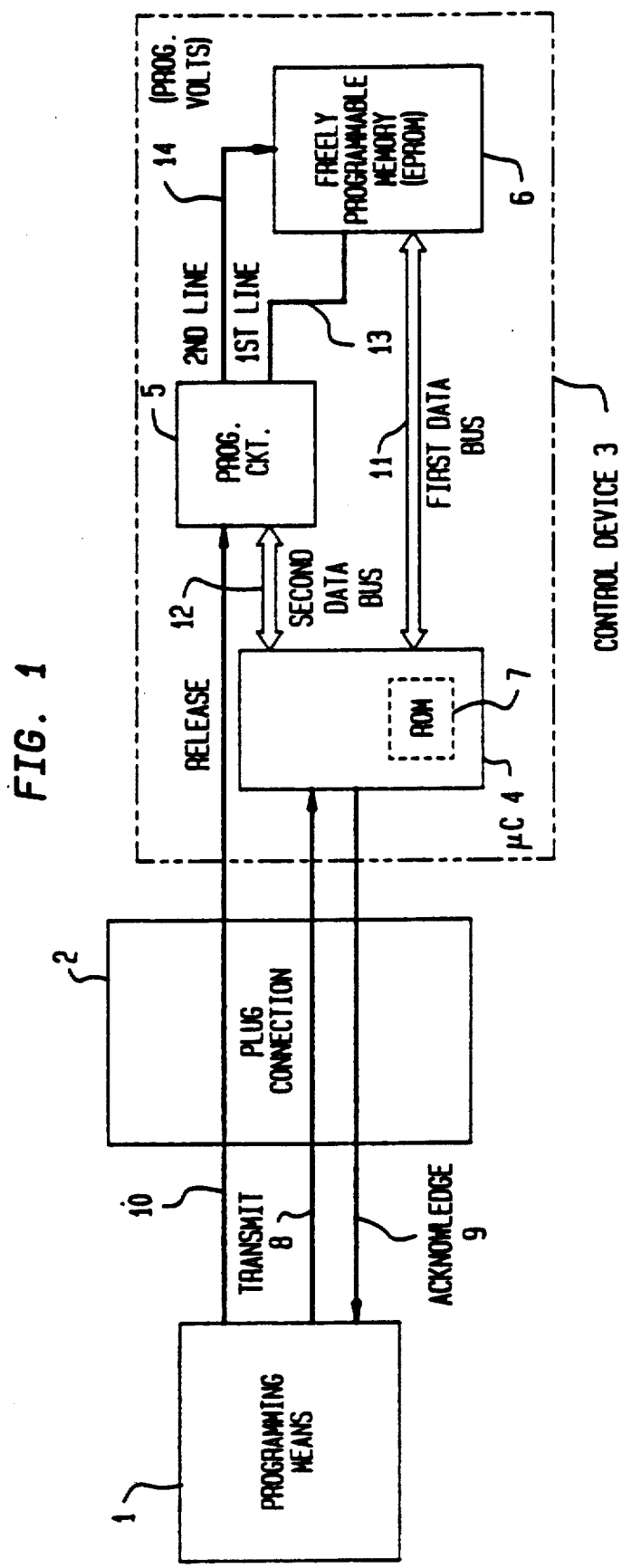
FIG. 1 is a block diagram of a control device according to the invention.

For input of the desired information into the freely programmable memory, the control device, as shown in FIG. 1, is connected by a plug connection to a programming device, a so-called programming station. The data relevant to the vehicle type are contained in the programming station.

FIG. 1 is a block diagram, in which a programming means 1 is connected via a plug connection 2 with a control device 3. The control device can be called upon for control and/or regulation of various functions, e.g. ignition instant regulation, dwell angle regulation, and regulation of fuel injection duration. It can also perform diverse monitoring functions. For simplicity of illustration, the connections of the control device to sensors and adjustable elements of the motor vehicle are omitted. Further, details of the housing of the control device are not illustrated. Preferably, however, the plug connection is integrated into the housing, in order to maintain the hermetic seal.

The control device 1 features a microprocessor 4, a programming circuit 5, as well as a freely programmable memory 6 e.g. an EPROM (Electrically Programmable Read-Only Memory). A permanently programmed memory 7, e.g. a ROM (Read-Only Memory), is indicated schematically integrated into microprocessor 4.

From programming means 1, a transmit line 8 runs to microprocessor 4, and from the latter, an acknowledgment line 9 runs back to the programming station 1, which is also connected, via a release line 10, with programming circuit 5. These three lines all run through plug connection 2. Between the microprocessor and the freely programmable memory 6, a first data bus 11 is provided. A second data bus 12 serves for control signal transmission from the microprocessor to the programming circuit 5, which is connected with memory 6 via a first line 13 and a second line 14. It is also possible to integrate all the aforementioned components of the control device into a single circuit.

The programming means 1 contains all vehicle-specific data which is input via plug connection 2 into control device 3.

The process of data transmission from a programming means to a control device having a microprocessor, using either a serial or a parallel interface, is conventional and well known.

Transmit line 8 is used to supply information to the microprocessor, which confirms its receipt via acknowledgment line 9. Between programming means and control device, there is thus, for data transmission purposes, a so-called two-wire dialogue. The data exchange, between microprocessor 4 and memory 6, which is necessary for normal operation, occurs via first data bus 11. Upon input of data, the information received over transmit line 8, is applied to memory 6 by means of first data bus 11. Second data bus 12 transmits, to programming circuit 5, the control signals need to program.

For programming of memory 6, a programming voltage adapted to memory 6 is applied to programming circuit 5 over a release line 10. This enables the simultaneous application to memory 6 of programming pulses over a first line 13 and of programming voltage over a line 14.

However, it is also possible to use a one-wire interface instead of the two-wire interface just described.

Figure 2:
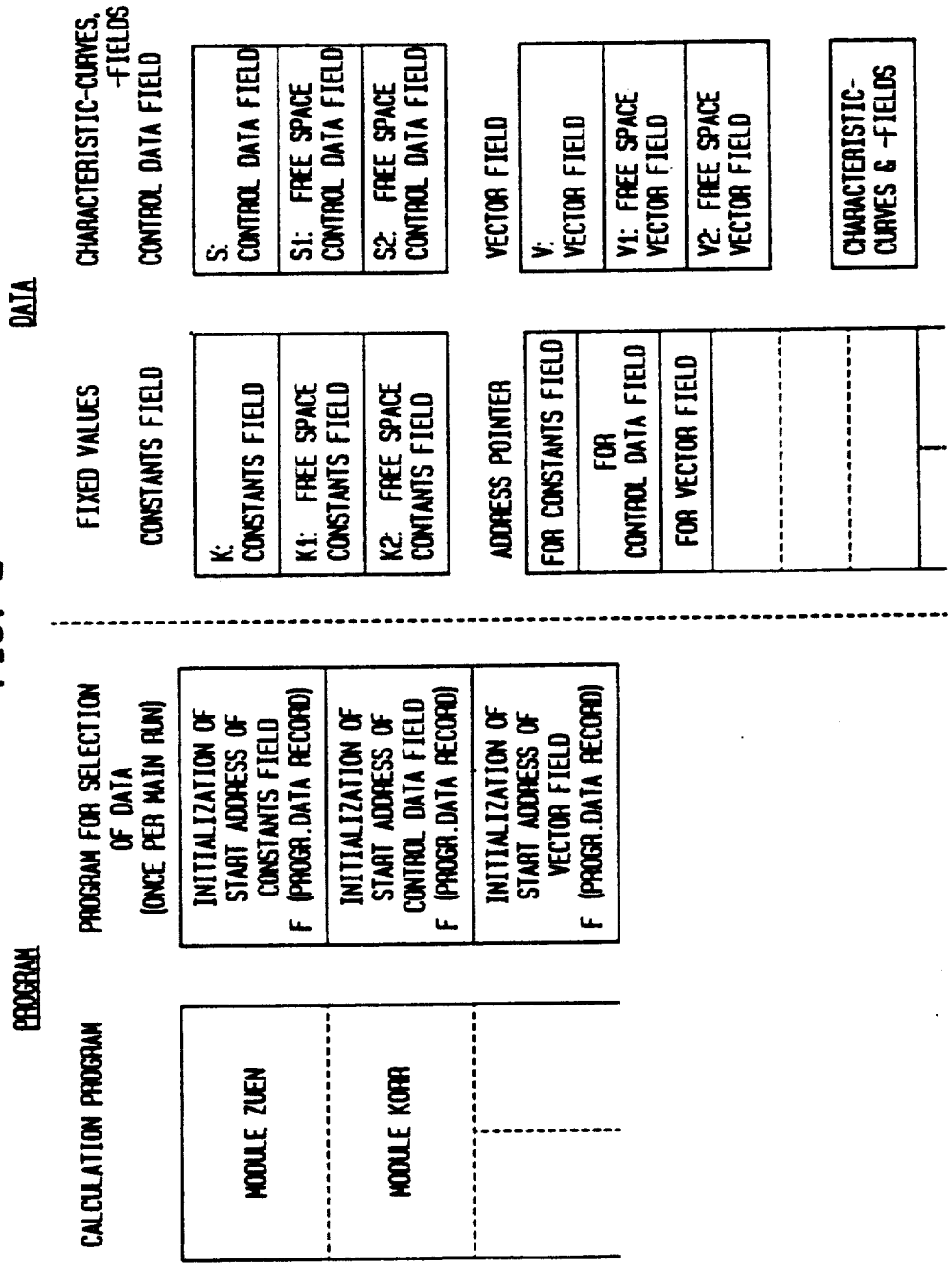
FIG. 2 illustrates the structure of the information stored in the control device.

FIG. 2 illustrates the programs input into permanently programmed memory 7 and the data stored in freely programmable memory 6. The programs are provided by the manufacturer of the control device. The data present in freely programmable memory 6 are retrieved with the aid of the program for selection of data and then are evaluated by means of the calculation program.

The selection program can also be stored in the freely programmable memory. In this case, the permanently programmed memory still contains a program algorithm. The calculation programs serve, for example, for calculation of ignition angle and of correction factors, which are, for example, considered in connection with fuel injection.

The following describes more precisely the manner of storage of information:

Initially, fixed values are input into a constant field designated here by K. These values are controlled by the programming means. If a defective memory cell falsifies the value input, a further storage operation takes place at another free spaces which can be used for re-storage of fixed values.

Subsequently, data are input into a control data field S. Upon occurrence of an error, a further storage operation also takes place at a new memory address. Similarly, S1 and S2 designate spare spaces for the control data. These serve to differentiate among characteristic-curves and -fields which are input in a following storage step. If such differentiation is not necessary for the calculation program, the control data field can be omitted.

Should defective memory cells be encountered during input of characteristic-curves and -fields, the input of these data can be repeated at other memory addresses. Corresponding free spaces are also provided here.

The addresses of the characteristic-curves and -fields are stored in a vector field V. The addresses are selected such that memory addresses with defective memory cells are not listed.

Finally, an address pointer is input, which contains the actual addresses of the constant field, of the control data field, and of the vector field.

The storage of the address pointer begins from a fixed start address which is stored in the permanently programmed memory 7 in the program for selection of data. If a defective memory cell is encountered during storage of the address pointer, the data record is stored at a following memory address. The addresses in the address pointer memory area are separated into groups, with the number of elements in a group corresponding to the number of addresses to be stored. In the present example, therefore, each group consists of three successive addresses.

This memory structure assure that, upon read-out of the address pointer, the actual, correct addresses are read out.

Initially, the individual groups of address in the address pointer field beginning at the fixed start address are read out with the help of the selection program. If a group of free addresses is encountered, it is assured that, the actual address record is stored in the immediately preceding group. Therefore, whenever, due to a defective memory cell, the valid addresses of the address pointer are not stored until the second memory operation, this read-out process assures that no read-out from the false address takes place.

In this fashion, defective memory cells are identified during storage of data and of addresses. In case of error, a memory operation is repeated. The retrieval codes in the vector field and in the address pointer always point to the actual memory location.

Due to the clear, unambiguous association of the stored information and of the retrieval codes, one can store data records and address groups of arbitrary length. Furthermore, it is possible to subsequently modify the data records. Thus, new data, e.g. fixed values or control data, and also characteristic-curves and -fields, can be input into spare spaces left free during the first storage operation or into arbitrarily selected free memory locations.

Thereafter, in case of changes to characteristic-curves and -fields, the vector field is read out, matched to the new addresses, and input at new locations. If a change does not alter the characteristic-curves and -fields, the vector field also remains unchanged.

Finally, the address pointer is read out, actualized, and input into the address group following the original address record.

With this control device and with this method, arbitrary data and addresses selected by customers can be read into freely programmable memory 6, and errors due to defective memory cells are avoided. Moreover, the stored information can later be modified by the user of the control device without any problem.

In the event that specific data groups often need to be used in alternation, such as when gasoline quality changes often due to multiple frontier crossings, the control scheme can be modified to the extent that different data records adapted to this situation are input into the freely programmable memory. The selection of the data records can be carried out by an interrogation routine or by a switching element. In this manner, consumption of memory upon each data change is avoided.

I claim:

1. Method for assuring integrity of information being stored in a control device having:
   at least one microprocessor (4),
   at least one permanently programmed memory (ROM 7) for storage of control programs, and
   at least one freely programmable and reprogrammable read memory (EPROM 6) having a plurality of memory locations,
   comprising the steps of
   storing in said read memory (6) information including an address pointer which begins at a fixed start address, said address pointer referencing addresses of at least one of the following types of information:
   data,
   fields, and
   constants, which are stored together with the address pointer in the read memory (6), and
   updating said information by at least partially replacing previously stored information by current information of the same type(s) as that previously stored wherein loss of previously stored data by faulty overwriting is avoided by first identifying free memory locations and subsequently writing said current information only into free memory locations which contain no previously stored information.

2. Method according to claim 1,
   characterized in that
   the address pointer for current data, fields and/or characteristic curves are written into the address group of the address pointer which follows the original address record.

3. Method according to claim 1,
   further comprising the steps of
   searching through addresses stored in the address pointer, by means of a program stored in the permanently programmed memory (7), until a group of free memory locations is found, and
   interpreting, as a current address pointer, contents of a group of addresses immediately preceding said free memory locations.

4. Method according to claim 2,
   further comprising the steps of
   searching through addresses stored in the address pointer, by means of a program stored in the permanently programmed memory (7), until a group of free memory locations is found, and
   interpreting, as a current address pointer, contents of a group of addresses immediately preceding said free memory locations.

5. Method according to claim 1,
   further comprising the steps of
   writing new data, fields and characteristic-curves into free memory locations by means of a programming device (1),
   testing for error during said writing of data, fields and/or characteristic-curves, and, upon detection of such error, carrying out a further writing operation at other free memory locations and
   referencing, by the address pointer, said other locations.

6. Method according to claim 2,
   further comprising the steps of
   writing new data, fields and characteristic-curves into free memory locations by means of a programming device (1),
   testing for error during said writing of data, fields and/or characteristic-curves, and, upon detection of such error, carrying out a further writing operation at other free memory locations and
   referencing, by the address pointer, said other locations.

7. Method according to claim 3,
   further comprising the steps of
   writing new data, fields and characteristic-curves into free memory locations by means of a programming device (1),
   testing for error during said writing of data, fields and/or characteristic-curves, and, upon detection of such error, carrying out a further writing operation at other free memory locations and
   referencing, by the address pointer, said other locations.

8. Method according to claim 4,
   further comprising the steps of
   writing new data, fields and characteristic-curves into free memory locations by means of a programming device (1),
   testing for error during said writing of data, fields and/or characteristic-curves, and, upon detection of such error, carrying out a further writing operation at other free memory locations and
   referencing, by the address pointer, said other locations.

* * * * *